3,096,250
NOVEL PARTICULATE ANTIGENS AND PROCESS
Joseph S. Ingraham, Indianapolis, Ind., assignor to Indiana University Foundation, Bloomington, Ind.
No Drawing. Filed Nov. 30, 1959, Ser. No. 856,018
4 Claims. (Cl. 167—84.5)

This invention relates to novel particulate antigens and to a process for their preparation.

Particulate antigens are useful for the detection of antibodies by agglutination techniques and for immunization by inoculation into susceptible hosts. In the past, one variety of partculate antigen has been prepared by coupling an antigen or hapten to an erythrocyte. The coupling agents most frequently employed for the preparation of these diagnostic antigens have been bis-diazotized benzidine and tannic acid. While particulate antigens formed by coupling a soluble antigen to an erythrocyte with one of the above coupling agents have been very useful, they suffer from serious drawbacks. Among these drawbacks are lack of sensitivity and lack of stability. This latter weakness necessitates the storage of the particulate antigen either frozen or in a lyophilized state. In addition, particulate antigens which lack stability must be used shortly after being resuspended at room temperature before their original sensitivity begins to decrease.

It is an object of this invention to provide a particulate antigen which is both stable and extremely sensitive. It is a further object of this invention to provide a process for preparing stable and highly sensitive particulate antigens, which process is capable of use with a wide variety both of erythrocytes and of soluble antigens.

In fulfillment of the above and other objects, this invention provides a novel variety of particulate antigens comprising an erythrocyte coupled to a proteinaceous antigen or hapten by means of an aldehyde, particularly formaldehyde. This invention also provides a method of preparation the above particulate antigens, which process comprises the coupling of a proteinaceous antigen to an erythrocyte by means of formaldehyde under controlled conditions of acidity.

The novel particulate antigens of this invention contain an erythrocyte coupled to one or more proteinaceous antigen molecules, using formaldehyde or another aldehyde as a coupling agent. A wide variety of erythrocytes can be employed in my novel antigens. Erythrocytes of mammalian and avian origin are particularly useful in forming the particulate antigens of this invention. For example, sheep erythrocytes, chicken erythrocytes and rabbit erythrocytes, can all be used successfully. However, I prefer to use human erythrocytes since they are readily available and particulate antigens prepared therewith are more free from non-specific reactions than those derived from rabbit or sheep erythrocytes.

A wide group of proteinaceous antigens can be used as components of the novel particulate antigens of this invention. These proteinaceous antigens include proteins such as the albumens and the globulins, viruses of all types and molecular weights, denatured proteins, polypeptides such as insulin or glucagon (hypoglycemic factor) and the like. In fact, almost any proteinaceous antigen or hapten which forms a stable aqueous solution or suspension can be coupled with formaldehyde to an erythrocyte as provided by the process of this invention.

The aldehydic agent customarily utilized to couple the soluble antigen to the erythrocyte is formaldehyde because of its greater reactivity and ease of handling, although other water soluble aldehydes such as acetaldehyde can also be used.

The process of preparing the diagnostic antigens of this invention is in general carried out as follows: a suspension of erythrocytes is mixed with a solution of the aldehyde and the solution is kept in the vicinity of room temperature until the interaction of the erythrocytes with the aldehyde has gone nearly to completion. The length of time required for this step naturally depends on the temperature at which the mixture is maintained, higher temperature requiring shorter periods of time. The aldehyde treated erythrocytes can be washed at this point to remove soluble cellular products, although such a step is not necessary. The treated erythrocytes are then mixed with an aqueous solution or suspension of proteinaceous antigen at a pH in the neighborhood of the isoelectric point of the antigen. The interaction of the antigen and aldehyde-treated erythrocytes ordinarily progresses for several days with constant mixing at a temperature of about 25° C. As with the aldehyde-erythrocyte interaction, higher temperatures (37° C. to 56° C.) require shorter reaction times and lower temperatures (0° C.) longer reaction times. The maximum permissible temperature for this reaction depends on the heat stability of the proteinaceous antigen; for example, denatured antigens can be treated at higher temperatures than undenatured antigens.

An alternative method of forming the particulate antigens of this invention comprises mixing together the erythrocyte, the antigen solution or suspension and the aldehyde coupling agent and then allowing the mixture to stand until the particulate antigen has been formed by the interaction of the components.

Control of the pH (acidity) of the antigen-formalinized erythrocyte interaction is critical, and as previously stated the pH should be maintained in the neighborhood of the isoelectric point of the soluble antigen; that is to say, the pH should be within 2 pH units above or below the isoelectric point of the antigen and preferably within 1 unit above or below. For example, if a soluble globulin has an isoelectric point at pH 5, the pH of the soluble antigen-erythrocyte coupling solution should be between pH 3 and pH 7 and preferably between pH 4 and pH 6. Very acid or very basic pH's are also to be avoided for obvious reasons. The control of the pH of the reaction mixture is best maintained by means of a buffer which does not react with the aldehyde or other component of the reaction.

More specifically, the novel process of my invention is carried out as follows, using for illustrative purposes only, human erythrocytes, and formaldehyde, as the coupling reagent: a suspension of human erythrocytes previously washed with saline is prepared and is treated with formalin solution. The concentration of the formalin to be added is not critical, but the concentration of formaldehyde in the erythrocyte suspension should be between 2 to 8% with a concentration at about 4% being preferred. The mixture is maintained at a temperature between 0° C. and 37° C. with occasional mixing to keep the erythrocytes in suspension. The formalinized erythrocytes can be used immediately in the second step of the process or they can be stored at about 1° C. for periods of up to 2.5 years. Next, a solution of the soluble antigen is added to the above suspension of formalinized erythrocytes. The formalinized erythrocytes can be washed free of formalin at this point although this step is not necessary. The soluble antigen is added at the rate of from 0.1 to 25 mg. per ml. of 10% erythrocyte suspension, with from 5 to 10 mgs. per ml. of 10% cell suspension being the preferred concentration range. The formaldehyde concentration in the coupling step is not critical and can vary from that amount which remains in the cells after washing up to 8% or even higher, with the higher concentrations being preferred since a more sensitive particulate antigen is produced thereby. The formaldehyde concentration is conveniently that procured by diluting the unwashed formalinized erythrocytes with the soluble antigen suspension or solution. When higher concentrations are desired, the formalinized erythrocytes can be washed free of the original formaldehyde solution and can be resuspended in a more concentrated formaldehyde solution. Sufficient phosphate-citrate buffer is added to the coupling solution to keep the pH in the desired range and the reaction mixture is maintained at ambient room temperature for several days with sufficient stirring being provided to keep the erythrocytes in suspension. Particulate antigens prepared by the procedure set forth above, can immediately be washed free of formaldehyde with saline and then stored at about 3–5° C. until needed or, alternatively, they can be stored in the coupling solution and then washed with saline just prior to use.

The particulate antigens of this invention are employed for titrating antibodies in the same fashion as the particulate antigens prepared by the methods of the prior art. For example, erythrocytes coupled with Echinococcus hydatid fluid antigen, using formaldehyde as the coupling agent, are washed four times with 30 volumes of saline and are then resuspended in saline to give a density of about $8 \times 10^7$ cells per ml. by volume. Aliquots of this suspension are added to serial two-fold dilutions of human serum suspected of containing antibodies to Echinococcus hydatid antigens and the absence or presence of agglutination is determined either by turbidometric means, or visually.

Particulate antigens derived from a polio virus coupled with formaldehyde to erythrocytes can be employed to determine antibody levels in a population, including both immunized and non-immunized persons. Particulates antigen of this type can also be used for immunization purposes.

The particulate antigens of this invention have a high degree of sensitivity for antibodies specific for the coupled antigen. For example, a particulate antigen made from human erythrocytes coupled to bovine gamma globulin with formaldehyde as a coupling agent, gave agglutination titers of from 1,300,000 to 5,600,000 against serum from rabbits sensitized to sulfanilazo bovine gamma globulin.

This invention is further illustrated by the following specific examples:

EXAMPLE 1

Preparation of Particulate Antigens from Bovine Gamma Globulin and Human Erythrocytes Human type O red cells were used from 2–3 weeks after being drawn into acid-citrate-dextrose solutions. The cells were washed 4 times with 10 volumes of saline (0.85% sodium chloride 0.005 molar in sodium phosphate) containing 0.5% dextrose. This solution had a pH of about 7.3. A 50% suspension of the above washed erythrocytes was made in saline maintained at a temperature between 1–5° C. One volume of the saline cell suspension was poured into 4 volumes of cold 5% formalin-saline prepared by diluting 1 volume of neutralized 37% aqueous formaldehyde solution containing 11.9% methanol with seven volumes of saline having a concentration of 1.14 times that given for the previous saline solution. The final suspension thus contained 10% erythrocytes and 4% formaldehyde in saline, at a pH between 7 and 7.3. The suspension was stored at about 2° C. for 10 days, and was shaken daily to resuspend the cells. The formalinized erythrocytes were next washed 4 times with 30 volumes of saline and were resuspended in saline so as to give a 50% suspension. One volume of this 50% suspension was then mixed with 4 volumes of 10% aqueous formaldehyde in 0.4% NaCl. One half ml. of 10% bovine gamma globulin in saline was added to 10 ml. of the above suspension. Two ml. of a phosphate-citrate buffer at pH=6 prepared according to MacIlvaine's standards (as set forth in Clark—Determination of Hydrogen Ions— 1928, Williams and Wilkins Balz) but at 2.5 times the concentration, were added. The mixture was maintained for 5 days at ambient room temperature while being gently rotated so as to keep the cells in suspension. The bovine gamma globulin formaldehyde-coupled erythrocytes were washed 4 times with saline, were resuspended in 4% formalin-saline and stored at about 1° C.

The particulate antigen thus prepared was removed from storage just prior to use.

After washing 4 times with phosphate buffered saline at pH=7.2–7.4, the particulate antigen cells were tested for pattern agglutination with rabbit anti-bovine serum globulin, using procedures well known to the art. The particulate antigens were agglutinative to a dilution of 1 to 1,000,000 or higher of the rabbit serum.

The above particulate antigen preparation has been repeated with formaldehyde concentrations in the formalinizing solution varying from 3.3% to 8% with the temperature of the formalinizing solution varying from 1° C. to 28° C., and the pH of the formalinizing solution from pH=6.5 to 7.5, with the concentration of the formaldehyde in the coupling solution varying from that which remained after washing the cells up to 8% and with from 0.1 to 25 mg. of bovine gamma globulin per ml. of 10% formalinized human erythrocyte suspension.

EXAMPLE 2

Preparation of Particulate Antigens From Ovalbumin and Human Erythrocytes

Human erythrocytes were formalinized by the procedure of Example 1. The formalinized erythrocytes were washed and resuspended in an 8% formalin solution containing 0.4% saline. Twenty parts of a 10% suspension of formalinized erythrocytes were mixed with 4 parts of a pH=4 phosphate-citrate buffer (MacIlvaine's) of 2½ times the usual strength and with 2 parts of a 10% solution of recrystallized hen's ovalbumin. The mixture was placed in a polyethylene bottle and rotated for 5 days at ambient room temperature. The particulate antigens thus prepared gave a 50% settling rate endpoint as measured photometrically against rabbit anti-ovalbumin serum at a 1 to 6400 dilution.

EXAMPLE 3

Alternate Preparation of Particulate Antigens From Bovine Serum Globulin and Human Erythrocytes Fresh human blood cells suspended in an acid-citrate-dextrose solution were centrifuged. The centrifuged cells were washed several times with saline and were then resuspended in saline so as to give a 50% suspension. Six ml. of this erythrocyte suspension were added with stirring to a mixture of 6 ml. of a pH=5.8 MacIlvaine phosphate-citrate buffer of 2.5 times the usual concentration, 1.5 ml. of a 10% bovine serum globulin solution in 0.85% saline and 24 ml. of a 10% formaldehyde solution in 0.85% saline at pH=6. The mixture was rotated for 5 days at ambient room temperature. Particulate antigens thus prepared were agglutinated specifically by rabbit anti-bovine globulin serum at a 1 to 1,600,000 dilution.

EXAMPLE 4

Preparation of Particulate Antigens From Chicken Erythrocytes and Bovine Serum Globulin Chicken red cells freshly drawn into acid-citrate-dextrose were formalinized as set forth in Example 1. The formalinized chicken erythrocytes were stored at about 1° C. in formalin solution for about 2 months. The formalinized cells were then washed with saline and were resuspended as a 10% suspension in 8% neutral formaldehyde solution in 0.4% saline. 5 ml. of this suspension were mixed with 1 ml. of a pH=5.8 MacIlvaine phosphate-citrate buffer at 2.5 times the usual strength, and 0.25 ml. of a 10% solution of bovine serum globulin in saline. The mixture was gently shaken at bout 37° C.

for 5 hrs. the particulate antigens thus prepared after washing were agglutinated by a 1 to 6,000,000 dilution of rabbit anti-bovine globulin.

Similar results were obtained by substituting formalinized rabbit or sheep erythrocytes in place of the chicken erythrocytes.

EXAMPLE 5

*Preparation of Particulate Antigens From Echinococcus Hydatid Fluid and Human Erythrocytes*

Formalinized human erythrocytes prepared by the process of Example 1 were washed and were packed by centrifugation. Seven-tenths ml. of these packed cells were mixed with 5 ml. of hydatid fluid antigen solution containing about 1 mg. protein per ml., 1.4 ml. of a pH=4.5 MacIlvaine phosphate-citrate buffer of 2.5 times the usual concentration and 1.4 ml. of 37% neutral formaldehyde. The moisture was shaken gently at about 37° C. for about 32 hrs. and the resulting particulate antigen was agglutinated by human serum from a known case of Echinococcus infection at a dilution of 1 to 6,400.

I claim:

1. A particulate antigen suspended in a buffered formaldehyde solution comprising a formalinized erythrocyte of the group consisting of avian and mammalian erythrocytes coupled to a soluble proteinaceous antigen by means of formaldehyde at a pH within 2 pH units of the isoelectric point of the proteinaceous antigen.

2. The particulate antigen of claim 1 in which the formalinized erythrocyte is a human erythrocyte.

3. The particulate antigen of claim 1 in which the formalinized erythrocyte is a chicken erythrocyte.

4. The process which comprises formalinizing erythrocytes and then coupling a proteinaceous antigen to the formalinized erythrocytes suspended in a buffered formaldehyde solution at a pH within 2 pH units of the isoelectric point of the proteinaceous antigen thereby forming a particulate antigen.

References Cited in the file of this patent

Strausser, Dissertation Abstracts, vol. XX, No. 1, July 1959, p. 430.

Flick, PSEBM, vol. 68, 1948, pp. 448–450.

Cox, J. Lab. and Clin. Med., 48:2, August 1956, pp. 298–303.

Boyd, Fund. of Immunology, Interscience Pub., New York, 3rd ed., 1956, pp. 300–301.

Kabat, Exptl. Immunochemistry, Chas. C. Thomas Co., Springfield, Ill., 1948, pp. 89–95.

Isliker, Purification of Antibodies, Annals, N.Y. Acad. of Sci., vol. 57, art. 3, Nov. 11, 1953, pp. 226–232.

Greenwalt, J. Lab. and Clin. Med., 48: 4, October 1956, pp. 634–636.

McKenna, PSEBM, vol. 95, 1957, pp. 591–93.